(12) United States Patent
Wolf et al.

(10) Patent No.: US 8,996,359 B2
(45) Date of Patent: Mar. 31, 2015

(54) TAXONOMY AND APPLICATION OF LANGUAGE ANALYSIS AND PROCESSING

(75) Inventors: Warren L. Wolf, Austin, TX (US); Manu Rehani, Portland, OR (US)

(73) Assignee: DW Associates, LLC, Austin, TX (US)

( * ) Notice: Subject to any disclaimer, the term of this patent is extended or adjusted under 35 U.S.C. 154(b) by 394 days.

(21) Appl. No.: 13/462,488

(22) Filed: May 2, 2012

(65) Prior Publication Data

US 2012/0296636 A1    Nov. 22, 2012

Related U.S. Application Data

(60) Provisional application No. 61/487,620, filed on May 18, 2011.

(51) Int. Cl.
*G06F 17/27* (2006.01)
*G10L 15/22* (2006.01)
*G10L 15/30* (2013.01)
*G10L 15/26* (2006.01)
*G06F 17/30* (2006.01)

(52) U.S. Cl.
CPC ...... *G06F 17/2785* (2013.01); *G06F 17/30705* (2013.01)
USPC .......... 704/9; 704/1; 704/4; 704/10; 704/270; 704/270.1; 704/275

(58) Field of Classification Search
CPC ..... G06F 17/28; G06F 17/21; G06F 17/2785; G06F 17/2705; G06F 17/2735; G06F 17/20; G06F 17/27; G06F 17/273; G06F 17/2765; G06F 17/279; G06F 17/2809; G06F 17/30684; G06F 17/30743; G06F 17/30796; G10L 21/00; G10L 21/06; G10L 15/183; G10L 15/193; G10L 15/18; G10L 15/24; G10L 15/265
USPC ..................... 704/1, 4, 9, 10, 270, 270.1, 275
See application file for complete search history.

(56) References Cited

U.S. PATENT DOCUMENTS

| 5,128,865 A | 7/1992 | Sadler |
| 5,249,967 A | 10/1993 | O'Leary et al. |
| 5,454,722 A | 10/1995 | Holland et al. |

(Continued)

FOREIGN PATENT DOCUMENTS

| JP | 2002149675 | 5/2002 |
| JP | 2004102428 | 4/2004 |

(Continued)

OTHER PUBLICATIONS

Khoury et al., A Methodology for Extracting and Representing Actions in Texts, 2006 IEEE International Conference on Fuzzy Systems, Jul. 16-21, 2006.*

(Continued)

*Primary Examiner* — Edgar Guerra-Erazo
(74) *Attorney, Agent, or Firm* — Marger Johnson & McCollom PC

(57) ABSTRACT

Words can be identified in text. Membership numerical values for the words can be determined in categories, or in communication types generated using those categories. The membership numerical values for the words can then be used to generate a signature. The signature can then be used to identify documents with a similar attitude.

27 Claims, 9 Drawing Sheets

(56) References Cited

U.S. PATENT DOCUMENTS

| | | | |
|---|---|---|---|
| 5,533,181 A | 7/1996 | Bergsneider | |
| 5,781,879 A | 7/1998 | Arnold et al. | |
| 5,796,948 A * | 8/1998 | Cohen | 709/206 |
| 5,797,123 A | 8/1998 | Chou et al. | |
| 5,857,855 A | 1/1999 | Katayama | |
| 5,877,120 A | 3/1999 | Wical | |
| 5,887,120 A | 3/1999 | Wical | |
| 5,961,333 A | 10/1999 | Harrison et al. | |
| 6,126,449 A | 10/2000 | Burns | |
| 6,138,085 A | 10/2000 | Richardson et al. | |
| 6,161,130 A * | 12/2000 | Horvitz et al. | 709/206 |
| 6,173,261 B1 | 1/2001 | Arai et al. | |
| 6,385,620 B1 | 5/2002 | Kurzius et al. | |
| 6,453,315 B1 | 9/2002 | Weissman et al. | |
| 6,504,990 B1 | 1/2003 | Abecassis | |
| 6,523,026 B1 | 2/2003 | Gillis | |
| 6,556,964 B2 | 4/2003 | Haug et al. | |
| 6,684,202 B1 | 1/2004 | Humphrey et al. | |
| 7,403,890 B2 | 7/2008 | Roushar | |
| 7,487,094 B1 | 2/2009 | Konig et al. | |
| 7,539,697 B1 | 5/2009 | Akella et al. | |
| 7,555,441 B2 | 6/2009 | Crow et al. | |
| 7,565,403 B2 | 7/2009 | Horvitz et al. | |
| 7,567,895 B2 | 7/2009 | Chen et al. | |
| 7,607,083 B2 | 10/2009 | Gong et al. | |
| 7,644,144 B1 | 1/2010 | Horvitz et al. | |
| 7,711,573 B1 | 5/2010 | Obeid | |
| 7,711,672 B2 | 5/2010 | Au | |
| 7,720,675 B2 | 5/2010 | Burstein et al. | |
| 7,792,685 B2 | 9/2010 | Andino, Jr. et al. | |
| 7,801,840 B2 | 9/2010 | Rapasi et al. | |
| 7,813,917 B2 | 10/2010 | Shuster | |
| 7,870,203 B2 | 1/2011 | Judge et al. | |
| 7,873,595 B2 | 1/2011 | Singh et al. | |
| 7,917,587 B2 | 3/2011 | Zeng et al. | |
| 7,945,497 B2 | 5/2011 | Kenefick et al. | |
| 7,966,265 B2 | 6/2011 | Schalk et al. | |
| 8,090,725 B1 | 1/2012 | Cranfill | |
| 8,108,389 B2 * | 1/2012 | Bobick et al. | 707/736 |
| 2002/0059376 A1 | 5/2002 | Schwartz | |
| 2002/0099730 A1 | 7/2002 | Brown et al. | |
| 2002/0106622 A1 | 8/2002 | Osborne et al. | |
| 2002/0143573 A1 | 10/2002 | Bryce et al. | |
| 2003/0027121 A1 | 2/2003 | Grudnitski et al. | |
| 2003/0028564 A1 | 2/2003 | Sanfilippo | |
| 2003/0093322 A1 | 5/2003 | Sciuk | |
| 2003/0144868 A1 | 7/2003 | MacIntyre et al. | |
| 2003/0167266 A1 | 9/2003 | Saldanha et al. | |
| 2003/0182310 A1 | 9/2003 | Charnock et al. | |
| 2003/0212541 A1 * | 11/2003 | Kinder | 704/4 |
| 2004/0030556 A1 | 2/2004 | Bennett | |
| 2004/0053203 A1 | 3/2004 | Walters et al. | |
| 2004/0117234 A1 | 6/2004 | Lindsay-Scott et al. | |
| 2005/0055209 A1 | 3/2005 | Epstein | |
| 2005/0060643 A1 * | 3/2005 | Glass et al. | 715/501.1 |
| 2005/0108001 A1 * | 5/2005 | Aarskog | 704/10 |
| 2005/0165600 A1 | 7/2005 | Kasravi et al. | |
| 2005/0192949 A1 | 9/2005 | Kojima | |
| 2005/0197890 A1 | 9/2005 | Lu et al. | |
| 2005/0202871 A1 | 9/2005 | Lippincott | |
| 2005/0204337 A1 | 9/2005 | Diesel et al. | |
| 2005/0262428 A1 | 11/2005 | Little et al. | |
| 2005/0272517 A1 | 12/2005 | Funk et al. | |
| 2005/0282141 A1 | 12/2005 | Falash et al. | |
| 2006/0047530 A1 | 3/2006 | So et al. | |
| 2006/0206332 A1 | 9/2006 | Paek et al. | |
| 2006/0230102 A1 | 10/2006 | Hidary | |
| 2006/0235843 A1 | 10/2006 | Musgrove et al. | |
| 2006/0246973 A1 | 11/2006 | Thomas et al. | |
| 2006/0271872 A1 | 11/2006 | Shirai | |
| 2007/0061179 A1 | 3/2007 | Henderson et al. | |
| 2007/0112710 A1 | 5/2007 | Drane et al. | |
| 2007/0135225 A1 | 6/2007 | Nieminen et al. | |
| 2007/0196798 A1 | 8/2007 | Pryor et al. | |
| 2007/0203720 A1 | 8/2007 | Singh et al. | |
| 2007/0203991 A1 | 8/2007 | Fisher et al. | |
| 2007/0213126 A1 | 9/2007 | Deutsch et al. | |
| 2007/0259324 A1 | 11/2007 | Frank | |
| 2007/0260421 A1 | 11/2007 | Berner et al. | |
| 2007/0265089 A1 | 11/2007 | Robarts et al. | |
| 2008/0027891 A1 | 1/2008 | Repasi et al. | |
| 2008/0052283 A1 | 2/2008 | Jensen et al. | |
| 2008/0097781 A1 | 4/2008 | Clarke et al. | |
| 2008/0162540 A1 * | 7/2008 | Parikh et al. | 707/102 |
| 2008/0191864 A1 | 8/2008 | Wolfson | |
| 2008/0208910 A1 | 8/2008 | MacIntyre et al. | |
| 2008/0275744 A1 | 11/2008 | MacIntyre et al. | |
| 2008/0281620 A1 | 11/2008 | Schalk et al. | |
| 2008/0288306 A1 | 11/2008 | MacIntyre et al. | |
| 2008/0288889 A1 | 11/2008 | Hunt et al. | |
| 2008/0300930 A1 | 12/2008 | Compitello et al. | |
| 2008/0319829 A1 | 12/2008 | Hunt et al. | |
| 2009/0006156 A1 | 1/2009 | Hunt et al. | |
| 2009/0006164 A1 | 1/2009 | Kaiser et al. | |
| 2009/0018996 A1 | 1/2009 | Hunt et al. | |
| 2009/0024554 A1 | 1/2009 | Murdock et al. | |
| 2009/0024747 A1 | 1/2009 | Moses et al. | |
| 2009/0035736 A1 | 2/2009 | Wolpert et al. | |
| 2009/0187446 A1 | 7/2009 | Dewar | |
| 2009/0198488 A1 | 8/2009 | Vigen | |
| 2009/0248399 A1 | 10/2009 | Au | |
| 2009/0282104 A1 | 11/2009 | O'Sullivan et al. | |
| 2009/0287672 A1 | 11/2009 | Chakrabarti et al. | |
| 2009/0292541 A1 | 11/2009 | Daya et al. | |
| 2009/0319508 A1 | 12/2009 | Yih et al. | |
| 2009/0326926 A1 * | 12/2009 | Landau et al. | 704/9 |
| 2009/0327208 A1 | 12/2009 | Bittner et al. | |
| 2010/0023377 A1 | 1/2010 | Sheridan | |
| 2010/0098289 A1 | 4/2010 | Tognoli | |
| 2010/0100496 A1 | 4/2010 | Baldwin et al. | |
| 2010/0131418 A1 | 5/2010 | McCagg et al. | |
| 2010/0145678 A1 | 6/2010 | Csomai et al. | |
| 2010/0153288 A1 | 6/2010 | Digiambattista et al. | |
| 2010/0174813 A1 | 7/2010 | Hildreth et al. | |
| 2010/0179845 A1 | 7/2010 | Davidson | |
| 2010/0179916 A1 | 7/2010 | Johns et al. | |
| 2010/0228733 A1 | 9/2010 | Harrison et al. | |
| 2010/0274636 A1 | 10/2010 | Sheridan | |
| 2010/0306251 A1 | 12/2010 | Snell | |
| 2011/0040837 A1 | 2/2011 | Eden et al. | |
| 2011/0055098 A1 | 3/2011 | Stewart | |
| 2011/0078020 A1 * | 3/2011 | LaJoie et al. | 705/14.53 |
| 2011/0106807 A1 * | 5/2011 | Srihari et al. | 707/739 |
| 2011/0161071 A1 * | 6/2011 | Duong-van | 704/9 |
| 2011/0184939 A1 | 7/2011 | Elliott | |
| 2011/0208511 A1 | 8/2011 | Sikstron et al. | |
| 2011/0258049 A1 | 10/2011 | Schwartz | |
| 2011/0295759 A1 | 12/2011 | Selvakummar et al. | |
| 2013/0185058 A1 * | 7/2013 | Rehani et al. | 704/9 |

FOREIGN PATENT DOCUMENTS

| | | |
|---|---|---|
| JP | 2004157931 | 6/2004 |
| JP | 2006061632 | 3/2006 |
| JP | 2007249322 | 9/2007 |
| WO | 2004055614 | 7/2004 |
| WO | 2008148819 | 12/2008 |
| WO | 2012000013 | 5/2012 |

OTHER PUBLICATIONS

Casey Whitelaw, Navendu Garg, and Shlomo Argamon. 2005. Using appraisal groups for sentiment analysis. In Proceedings of the 14th ACM international conference on Information and knowledge management (CIKM '05). ACM, New York, NY, USA, 625-631.*

Aiolli, Fabio; Sebastian!, Fabrizio; Sperduti, Alessandro, Preference Learning for Category-Ranking based Interactive Text Categorization, Proceedings of International Joint Conference on Neural Networks, ICJNN 2007, Orlando, Florida, Aug. 12-17, pp. 2034-2039.

Mood Indicator Based on History of Electronic Communication Thread, IPCOM, Disclosure No. IPCOM000198194D, Jul. 29, 2010, 3 pages, retrieved from http://ip.com/IPCOM/000198194.

(56) References Cited

OTHER PUBLICATIONS

Keh, Huan-Chao, The Chinese Text Categorization System with Category Priorities, Journal of Software, Oct. 2010, vol. 5, No. 10, pp. 1137-1143.
R. Hawkins and M. Russell, Document Categorization Using Lexical Analysis and Fuzzy Sets, IBM Technical Disclosure Bulletin, Jun. 1992, vol. 35, No. 1A, 1 Page.
Employee Engagement What's Your Engagement Ratio? Gallup Consulting 2008.
Schaufell, Wilmer B. et al. "The Measure of Work Engagement with a Short Questionnaire." A Cross-National Study. Educational and Psychological Measurement. vol. 66, No. 4. Aug. 2006.
Performance Optimization Framework Value Proposition. Introduction and Overview. Knowledge Advisors. Copyright 2009.
Kular, S. et al., Employee Engagement: A Literature Review. Kingston University, Kingston Business School. Working Paper Series No. 19. Oct. 2008.
Richards, David. Hellmann HR Team Instills Values and Behaviors. Strategic HR Review, 2008, 7, 4.
Parks, Louise et al. "A Test of the Importance of Work-Life Balance for Employee Engagement and Intention to Stay in Organisations." Journal of Management and Organization. vol. 14, Issue 3, Jul. 2008.
McBain, R. "The Practice of Engagement." Strategic HR Review. Sep./Oct. 2007; 6; 6.
Hyuna, Choi. "Managing Talent Thourgh Employee Engagement." SERI Quarterly. Jul. 2008.
Moon, K. et al., "Emotional States Recognition of Text Data Using Hidden Markov Models." Proceedings of 2001 Autumn KISS. 2001. vol. 28, No. 2, pp. 127-129.
International Search Report from PCT/US2013/022072, published as WO2013109836 on Jul. 25, 2013, 3 pages.
International Search Report from PCT/US2012/036330, published as WO2012158357 on Nov. 22, 2012, 3 pages.
International Search Report from PCT/US2011/058444, published as WO2012061254 on May 10, 2012, 3 pages.
International Search Report from PCT/US2011/058435, published as WO2012061252 on May 10, 2012, 8 pages.
Office Action dated May 5, 2009, U.S. Appl. No. 11/419,324, filed May 19, 2006 entitled "System and Method for Authoring and Learning".
Van Rijk, R et al., Using CrisisKit and MOPED to Improve Emergency Management Team Training, Proceedings ISCRAM 2004, Brussels, May 3-4, 2004. pp. 161-166.
Thomas, P.G. et al., AESOP—An Electronic Student Observatory Project, Frontiers in Education, 1998, 5 pages.
Loftin, R.B. et al., Training the Hubble Space Telescope Flight Team, IEEE Computer Graphics and Applications, 1995, pp. 31-37.
Office Action dated Jun. 16, 2008, U.S. Appl. No. 11/419,317, filed May 19, 2006 entitled "Method for Interactive Training and Learning."
Office Action dated Oct. 31, 2008, U.S. Appl. No. 11/419,317, filed May 19, 2006 entitled "Method for Interactive Training and Learning."
Office Action dated Jun. 16, 2009 U.S. Appl. No. 11/419,317, filed May 19, 2006 entitled "Method for Interactive Training and Learning."
Office Action dated Nov. 17, 2009 U.S. Appl. No. 11/419,317, filed May 19, 2006 entitled "Method for Interactive Training and Learning."
Aiolli, Fabio; Sebastiani, Fabrizio; Sperduti, Alessandro, Preference Learning for Category-Ranking Based Interactive Text Cagegorization, Proceedings of International Joint Conference on Neural Networks, ICJNN 2007, Orlando, FL, Aug. 12-17, 2007, pp. 2034-2039.
Mood Indicator Based on History of Electronic Communication Thread, IPCOM, Disclosure No. IPCOM00198194D, Jul. 29, 2010, 3 pages, retrieved from http://ip.com/IPCOM/000198194.
R. Hawkins and M. Russell, Document Categorization Using Lexical Analysis and Fuzzy Sets, IBM Technical Disclosure Bulletin, Jun. 1992, vol. 35, No. 1A, 1 pg.
Lingway Vertical Search Solutions, Lingway HR Suite, "Lingway e-Recruitment Applications: a Semantic Solution for Recruitment", retrieved from http://www.lingway.com/images/pdf/fichelhrslea07anglaisweb.pdf on Jun. 17, 2012 (2 pages).
Tseng, "Semantic Classification of Chinese unknown words", ACL '03 Proceedings of the 41st Annual Meeting on Association for Computational Linguistics—vol. 2 Association for Computational Linguistics Stroudsburg, PA, USA ©2003.
Mohammad, "Measuring Semantic Distance Using Distributional Profiles of Concepts", a thesis submitted in conformity with the requirements for the degree of Graduate Department of Computer Science University of Toronto, 2008, pp. 1-167.
Mohammad, et al., "Measuring Semantic Distance Using Distributional Profiles of Concepts", Association for Computational Linguistics; retrieved at http://www.umiacs.umd.edu/~saif/WebDocs/Measuring-Semantic-Distance.pdf, 2006, pp. 1-34.

\* cited by examiner

TAXONOMY AND APPLICATION OF LANGUAGE ANALYSIS AND PROCESSING

RELATED APPLICATION DATA

This application claims the benefit of U.S. Provisional Patent Application Ser. No. 61/487,620, filed May 18, 2012, which is herein incorporated by reference for all purposes.

FIELD

This invention pertains to semantics, and more particularly to attitudes represented in text.

BACKGROUND

While human beings have an intuitive ability to understand language, getting machines to understand language remains a complicated problem. The field of Artificial Intelligence has been working on understanding language for decades. But to date systems either have a very limited ability to understand language in general, or a significant ability to understand language in a very specialized subset of language. For example, voice response systems tend to have fairly limited vocabularies: outside the words the systems are designed to understand, they are lost.

Textual analysis has not fared better than understanding spoken language. With textual analysis, the entirety of the text is present, and (usually) in a form that leaves the system with no uncertainty about the specific letters being used (ignoring the problems of character recognition from scanned text). But systems still have difficulty understanding what the text represents. For example, the sentence "The old man the boats" can confuse systems that think the word "old" is an adjective and the word "man" is a noun, where in fact the word "old" is a noun and the word "man" is a verb.

Aside from the problem of discerning the intended meaning of various words—words that can be used in different parts of a sentence, or words that are homophones, for example—systems have difficulty discerning the underlying context of text. People when they write, no less than when they speak, convey an attitude about a subject. But systems have difficulty understanding what the writer's attitude is.

A need remains for a way to address these and other problems associated with the prior art.

DETAILED DESCRIPTION

Figure 1:
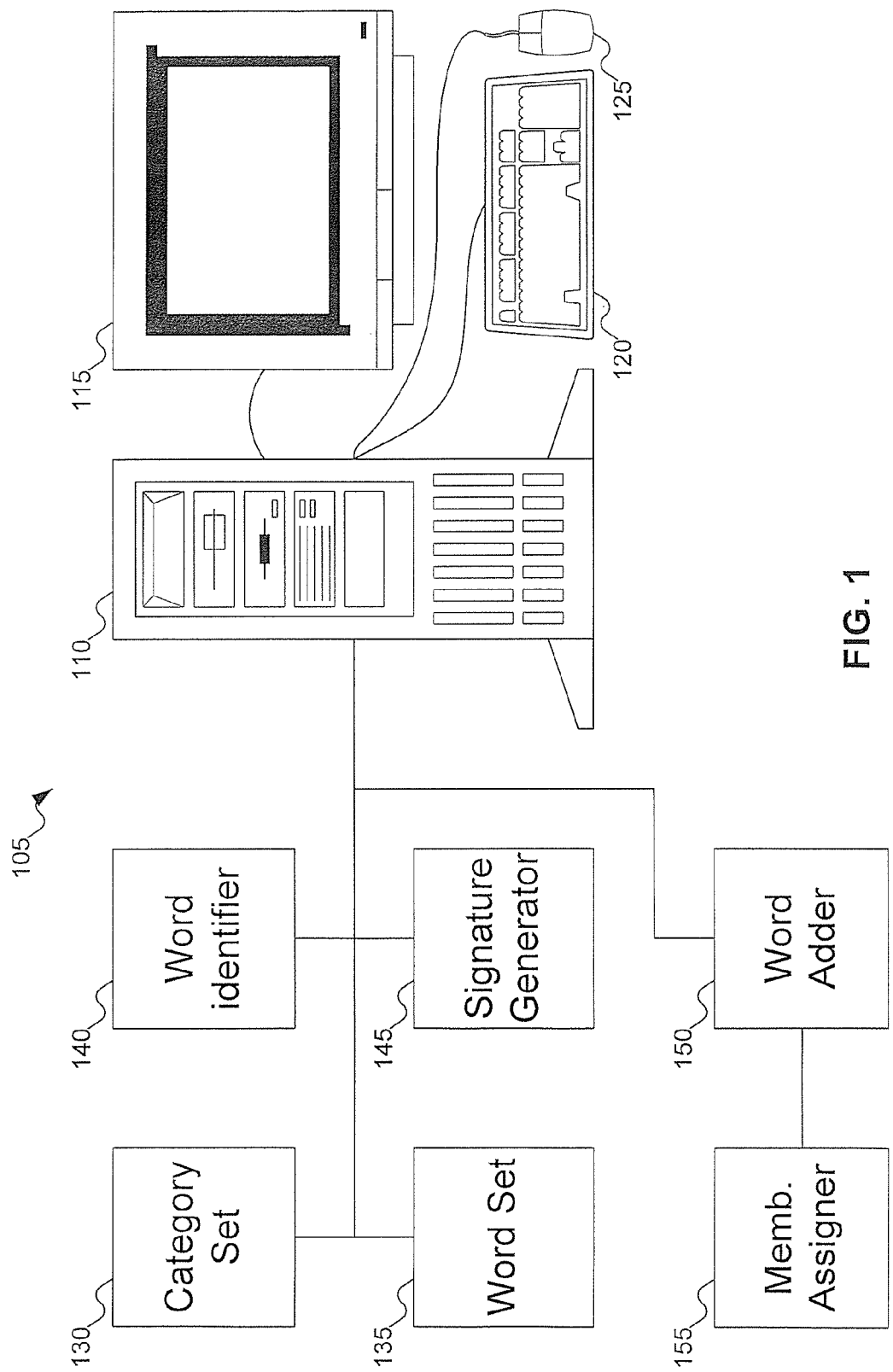
FIG. 1 shows a system for determining an attitude in text, according to an embodiment of the invention.

FIG. 1 shows a system for determining an attitude in text, according to an embodiment of the invention. FIG. 1 shows machine 105, which can be, for example, a server or a user's personal computer. In FIG. 1, machine 105 is shown as including computer 110, monitor 115, keyboard 120, and mouse 125. A person skilled in the art will recognize that other components can be included with machine 105: for example, other input/output devices, such as a printer. In addition, FIG. 1 machine 105 can include conventional internal components (not shown): for example, a central processing unit, a memory, storage, etc. Although not shown in FIG. 1, a person skilled in the art will recognize that machine 105 can interact with other machine, either directly or over a network (not shown) of any type. Finally, although FIG. 1 shows machine 105 as a conventional desktop computer, a person skilled in the art will recognize that computer system 105 can be any type of machine or computing device capable of providing the services attributed herein to machine 105, including, for example, a laptop computer, a personal digital assistant (PDA), or a cellular telephone.

Figure 2:
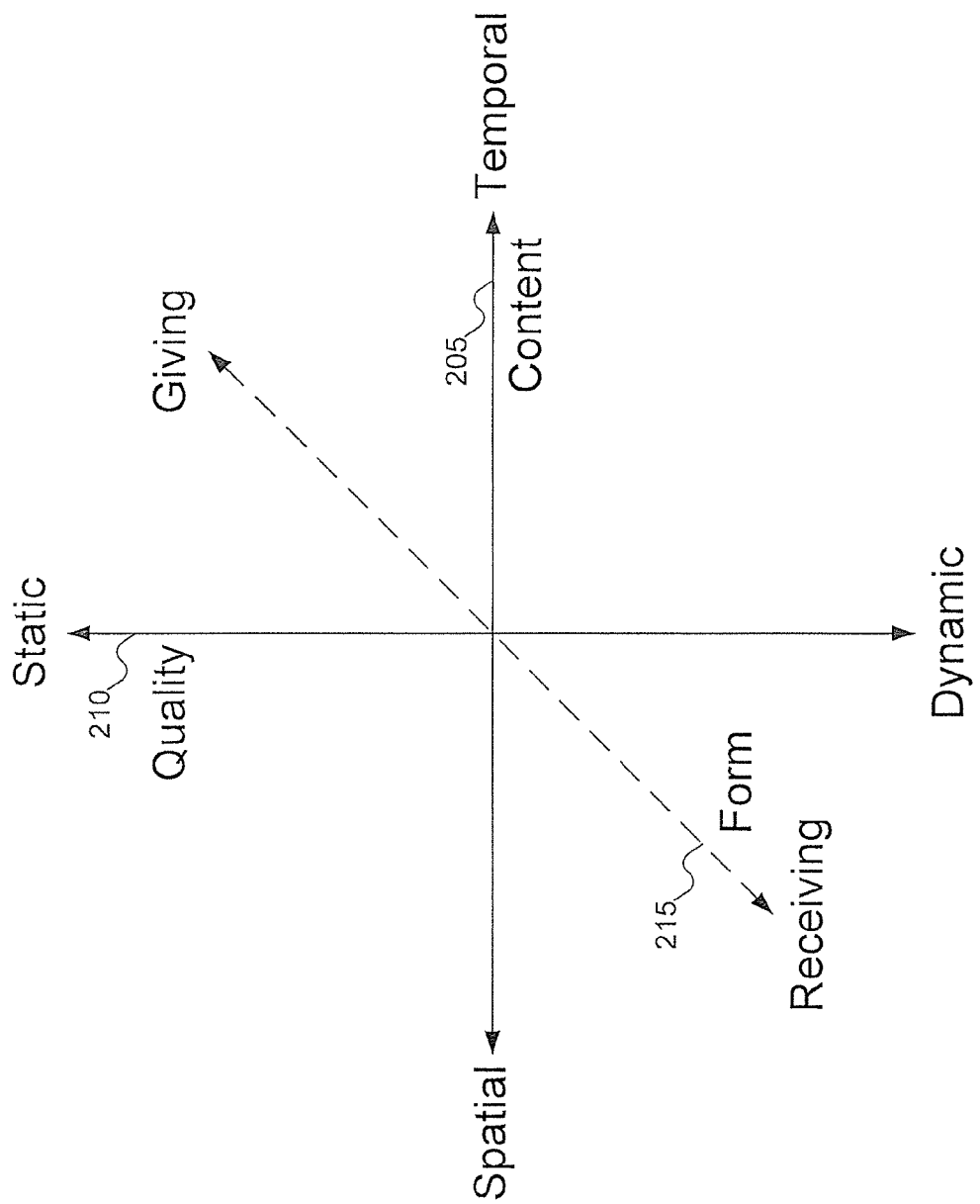
FIG. 2 shows dimensions along which categories from the category set of FIG. 1 can be aligned.

Machine 105 can include category set 130, word set 135, word identifier 140, signature generator 145, and word adder 150. Category set 130 includes a set of categories along which words can be aligned. For example, as shown in FIG. 2, one possibility for category set includes the categories of "content" (along dimension 205), "quality" (along dimension 210), and "form" (along dimension 215). In the example embodiment shown in FIG. 2, "content" dimension 205 relates to what the content (word or other unit of text) is about, "quality" dimension 210 relates to the quality of the content, and "form" dimension 215 relates to the direction the information is flowing (to or from the speaker). ("Form" dimension 215 is shown with a dashed line to represent that "form" dimension 215 is orthogonal to the page.)

Along each dimension (category), a word can take any value along the spectrum: this value represents the word's membership in the category. For example, along "content" dimension 205, a word can be either temporal or spatial in nature, and to any extent. Similarly, along "quality" dimension 210, a word can be dynamic or static in nature, and to any extent, and along "form" dimension 215, a word can be receiving or giving in nature, and to any extent. In general, each category is independent of the other categories, and therefore can be represented by a dimension that is orthogonal to the dimensions representing the other categories.

Either end of the spectrum can be associated with positive or negative numerical values, provided the association is consistent for all words. While the numerical values a word can take along any dimension can be unbounded, keeping the numerical values within the range of [−1, 1] has an advantage of keeping the numerical values normalized. But a person of ordinary skill in the art will recognize that normalization can occur after the membership numerical values are assigned.

While FIG. 2 shows three dimensions, a person of ordinary skill in the art will recognize that there can be any number of dimensions. The graph shown in FIG. 2 would be modified according to the number of categories (although a representation on paper becomes more complicated when the number of categories exceeds 3).

Figure 3:
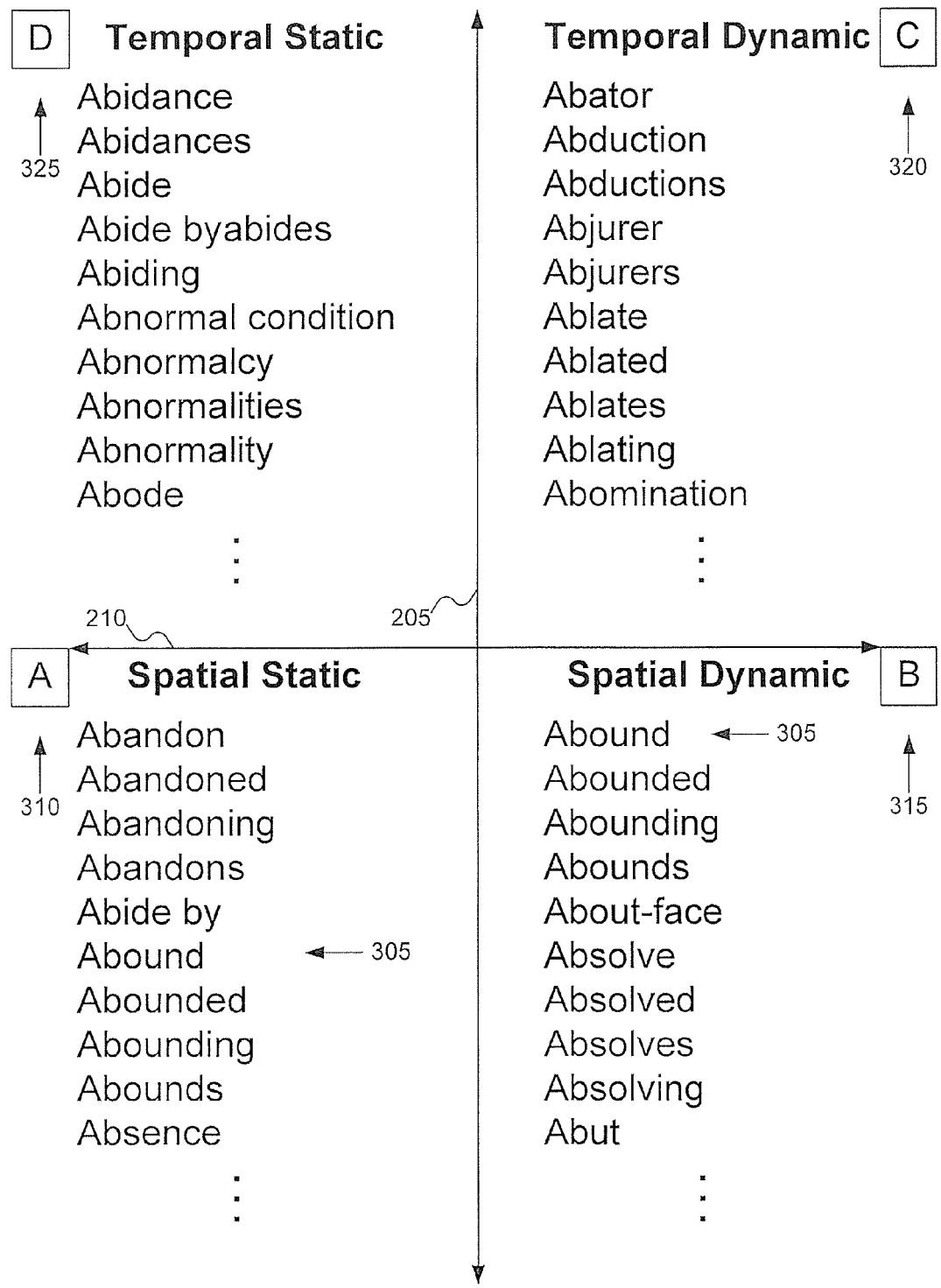
FIG. 3 shows words in the word set of FIG. 1, assigned to various communication types constructed from categories in the category set of FIG. 1.

While it is possible to generate signatures for text based on the direct category membership numerical values for words, another way to generate signatures is to identify communication types. A communication type is a combination of categories. For example, using just the "content" and "quality" dimensions 205 and 210, there are four categories: one for each quadrant in the graph of the two dimensions. These communication types can be identified by the ends of the respective dimensions: "temporal static", "temporal dynamic", "spatial static", and "spatial dynamic". Words can then be assigned membership in these communication types, as shown in FIG. 3. Words can be assigned membership in the communication types directly or indirectly. As an example of indirect membership can be to take the category memberships as they are known, and extrapolate the communication memberships from there. For example, the word "abandon" might be categorized along both "content" and "quality" dimensions 205 and 210, resulting in a membership in the "spatial static" communication type. In contrast, the word "abound" (word 305) might be categorized along "content" dimension 205 but neutral along "quality" dimension 210, resulting in a membership in both the "spatial static" and "spatial dynamic" communication types.

In FIG. 3, "content" and "quality" dimensions 205 and 210 are shown, with various words assigned to each communication type (i.e., a quadrant of the graph). The word lists shown in FIG. 3 are partial lists: there are many more words included in each communication type, of which FIG. 3 shows a subset. A complete list of words in each communication type can be found in U.S. Provisional Patent Application Ser. No. 61/487,620, filed May 18, 2012, incorporated by reference herein.

Examination of the word lists in FIG. 3 reveals some interesting points. First, not every word is necessarily present, even in only one list. For example, common words, such as "a", "an", and "the" do not necessarily appear. Second, words can appear in multiple lists. For example, "abound" (word 305) appears in both the "spatial static" and "spatial dynamic" lists". This can be indicative of the word "abound" (word 305) having no specific quality (i.e., the word "abound" is neutral relative to quality dimension 210), and only has membership in the "content" category (dimension 205).

Each communication type can be assigned a symbol, such as symbols 310, 315, 320, and 325. These symbols can be used as a shorthand for the specific communication type. For example, a reference to symbol "A" (symbol 310) can be a shorthand reference for the "spatial static" communication type. This notation provides benefits in how the signature is generated, as discussed below with reference to FIG. 4.

While FIG. 3 shows communication types associated with combinations of only two categories, a person of ordinary skill in the art will recognize that any number of categories can be combined to define the communication types, and FIG. 3 represents only an example embodiment. For example, FIG. 2 shows three dimensions: "content" 205, "quality", 210, and "form" 215: the communication types can be associated with all three dimensions. As should be apparent, the number of communication types grows exponentially with the number of categories. Thus, if all three dimensions shown in FIG. 2 are used in defining the communication types, there will be a total of 8 communication types; if 4 dimensions are used, there will be a total of 16 communication types, and so on.

While the term "word" implies a single lexicographic token, a person of ordinary skill in the art will recognize a "word" can be anything, including what might otherwise be considered multiple separate words. For example, the term "baseball bat" consists of two lexicographic words. But while each token of the term "baseball bat" might be a separate word, the images conveyed by each word separately differ from the image conveyed by the complete term. Thus, the meaning of the term "word" is not limited to concepts that can be represented with one word in the language.

Returning to FIG. 1, word set 135 is a set of words that have memberships in the various categories (or communication types). Word set 135 can be complete, in the sense that it includes every word in the language, or it can be partial, reflecting only those words that are considered significant to date. As discussed above with reference to FIG. 3, there are likely words, such as "a", "an", and "the", that are so common as to convey no particular meaning, and therefore do not need to be included in word set 135.

Word identifier 140 is responsible for identifying a word in some text: be it a block of text for which a signature is to be generated, or a document that is being searched. As discussed above, a "word" might include multiple tokens that could be considered separate words: word identifier 140 is responsible for identifying "words", regardless of how many tokens might be used to represent the concept.

Signature generator 145 is responsible for generating a signature for a block of text. Signature generator 145 is discussed further below with reference to FIG. 4.

Word adder 150 is responsible for adding new words to word set 135. Word adder 150 is discussed further below with reference to FIG. 5.

Figure 4:
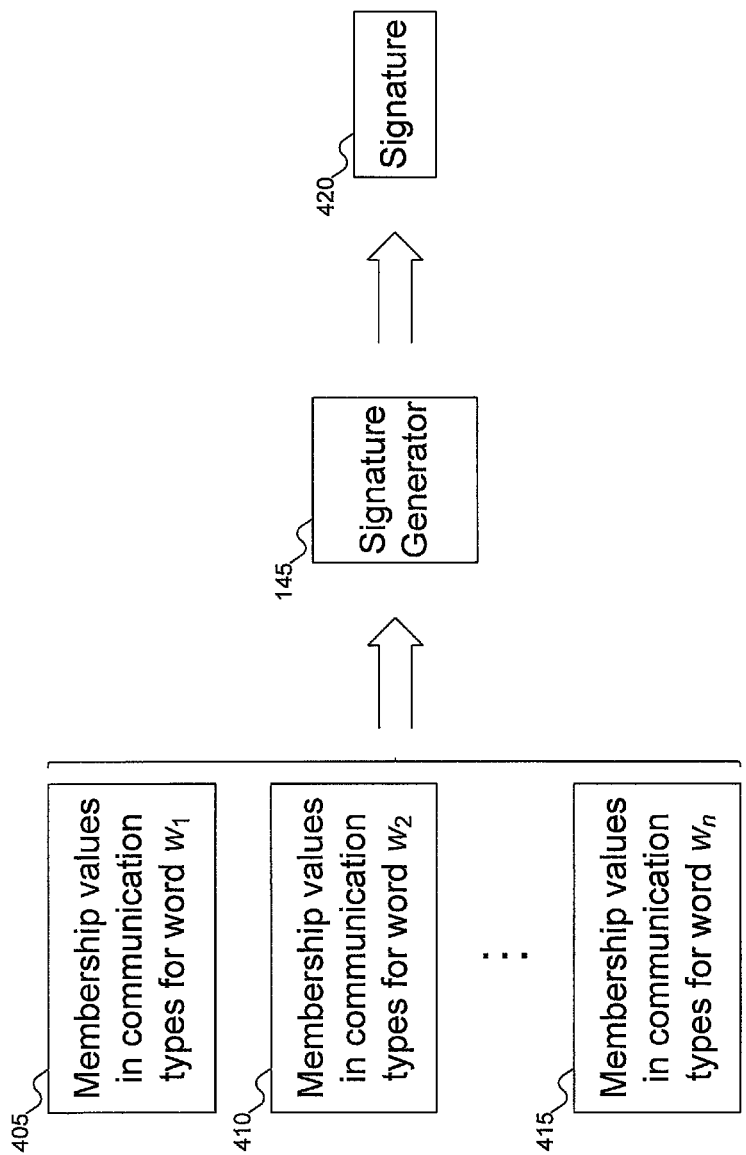
FIG. 4 shows how the signature generator of FIG. 1 can generate a signature for words in a block of text.

FIG. 4 shows how the signature generator of FIG. 1 can generate a signature for words in a block of text. In FIG. 4, for each word in the block of text, the words have memberships 405, 410, 415 in various communication types. These membership numerical values 405, 410, 415 are input to signature generator 145, and the signature generator can then calculate signature 420. Signature generator 145 can use any desired formula to calculate signature 420.

As an example of how signature generator 145 can calculate a signature for a block of text, consider three words $w_1$, $w_2$, and $w_3$. Word $w_1$ is assigned a membership value of 1 in communication type A (referring back to FIG. 3, this communication type is the "spatial static" communication type). Word $w_2$ is assigned a membership value of 0.5 in communication type A, and a membership value of 0.5 in communication type B. Word $w_3$ is assigned a membership value of 1 in communication type B. Then, for the combination of communication types A and B (represented as "AB"), the portion of the signature attributable to that combination can be calculated as the sum of the membership numerical values for each word in either the A or B communication types, divided by the number of membership numerical values being considered. In the provided example, the contribution of the AB combination can be calculated as (1+0.5+0.5+1)/4, or 0.75. Calculating this formula for each combination of communication types then produces the signature 0.75AA+0.75AB+ 0.75AC+0.75 AD+0.75BB+0.75BC+0.75 BD+0CC+0CD+ 0DD. This example is contrived and simple, but the calculation can be used for more complicated blocks of text, and can produce other signatures: for example, 0.17AA+ 0.37AB+0.15AC+0.14AD+0.66BB+0.43BC+0.04BD+ 0.71CC+0.29CD+0.03DD, or 0.34AA+0.25AB+0.04AC+ 0.80AD+0.22BB+0.72BC+0.91BD+0.10CC+0.19CD+ 0.37DD.

The above examples express the signatures as additive over the combinations of communication types. A person of ordinary skill in the art will recognize that the mathematical combination of the combinations of communication types can use any mathematical operation, and that the use of addition is merely exemplary.

As can be seen from the example signatures, a communication type can be combined with itself. Thus, "AA" represents a valid communication type, as do "BB", "CC", and "DD".

A cursory examination of the example signatures above, along with the algorithm used to calculate the signatures, shows that combinations of communication types are commutative. That is, there is no difference between "AB" and "BA" as communication types. But a person of ordinary skill in the art will recognize that if combinations of communication types are not commutative, then both combinations can be part of a signature.

Figure 5:
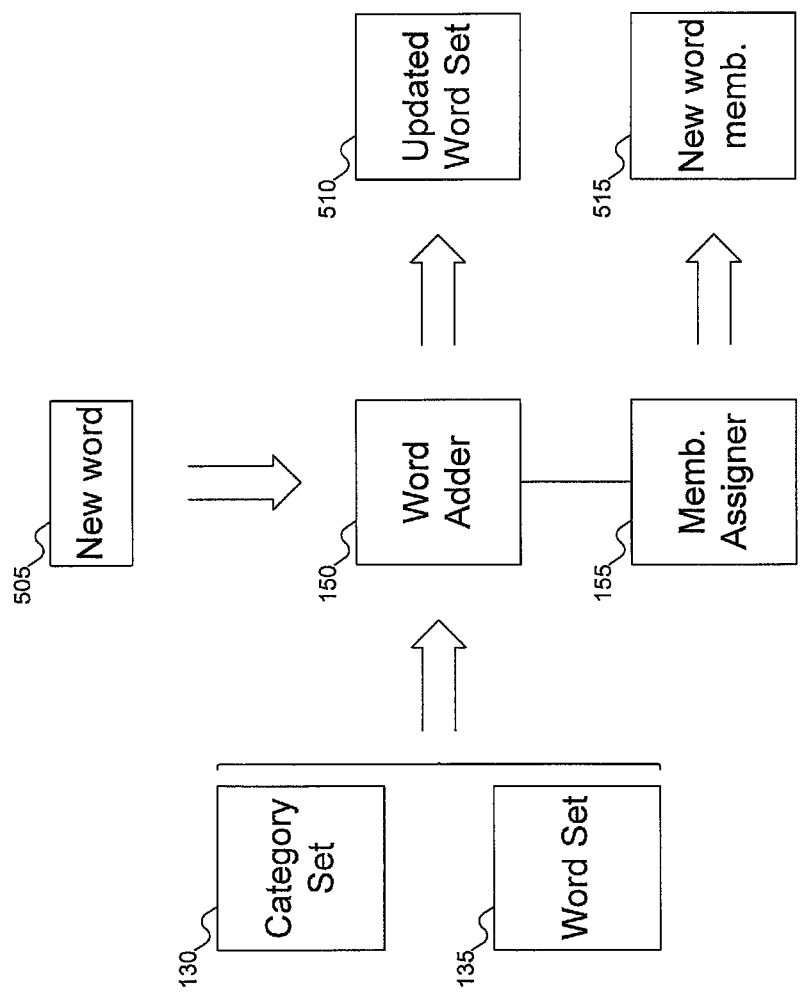
FIG. 5 shows how the word adder of FIG. 1 can be used to add a new word to the word set of FIG. 1.

FIG. 5 shows how the word adder of FIG. 1 can be used to add a new word to the word set of FIG. 1. In FIG. 5, new word 505 represents a word not currently in word set 135, and therefore not categorized within category set 130. Word adder 150 can be used to add new word 505 to word set 135, producing updated word set 510.

Word adder 150 can include membership assigner 155. Membership assigner 155 can be used assign new word 505 to one or more categories in category set 130, shown as new word membership 515. In embodiments of the invention using communication types as opposed to straight category memberships, membership assigner 155 can be used to assign new word 505 to communication types.

Figure 6:
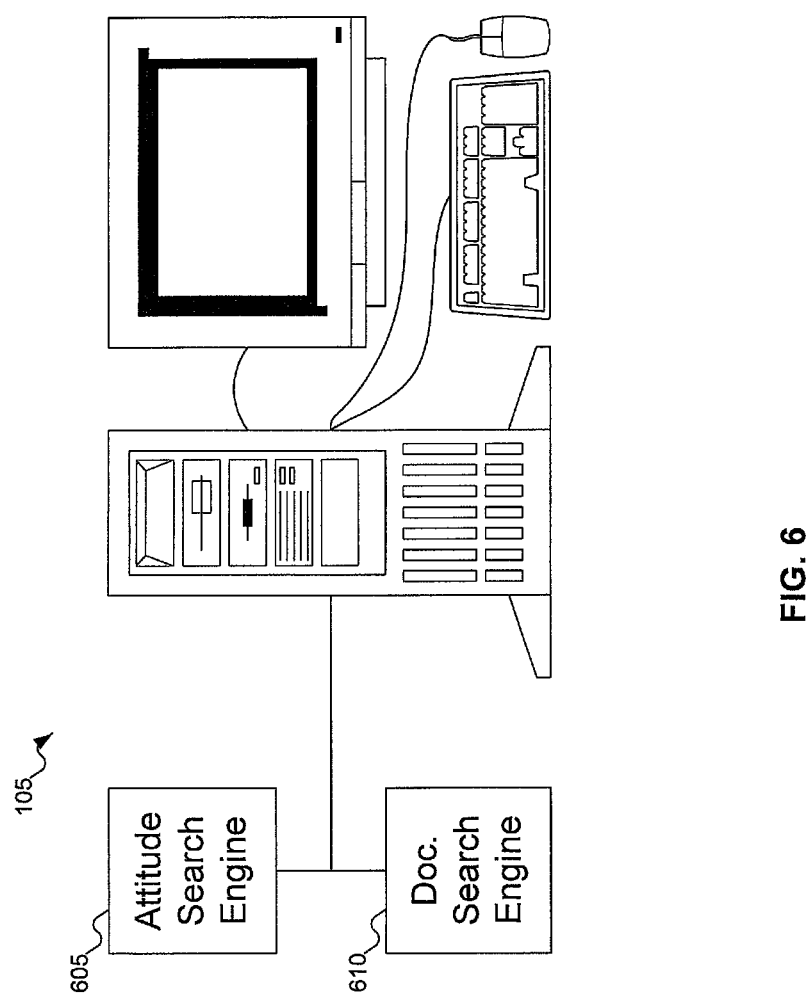
FIG. 6 shows the system of FIG. 1, combining an attitude search engine and a document search engine.

FIG. 6 shows the system of FIG. 1, combining an attitude search engine and a document search engine. In FIG. 6, machine 105 is shown as including both attitude search engine 605 and document search engine 610. Document search engine 610 is similar to known search engines that can be used to search for text, such as the Google™ search engine. (Google is a trademark of Google Inc.) Attitude search engine 605 can search for documents, rather than by text, by attitude. Given a signature, such as those discussed above, attitude search engine 605 can look for documents with a similar signature/attitude. Attitude search engine can locate just documents with an identical attitude, but it would be unusual for a document to have a signature identical to a given signature. Instead, attitude search engine 605 can locate documents that have similar, but not identical, attitudes: the located documents can be sorted based on how close/far their signature is from the given signature. Distance can be measured in any desired manner. Example distance measures can include Euclidean distance (square root of the sum of the squares of the distances between the corresponding coordinates) and taxicab distance (sum of the absolute values of the distances between the corresponding coordinates), among other possibilities.

Attitude search engine 605 obviously depends on knowing the attitude of the documents in the corpus (set) being searched. If the signatures of any of the documents in the corpus are not known in advance, they can be calculated as discussed above, just like a signature can be calculated for any other block of text. The signatures can be stored anywhere: with the document (as metadata), separately from the document (for example, in a signature storage database), or cached locally on machine 105, among other possibilities.

Attitude search engine 605 and document search engine 610 can be combined in any sequence. For example, document search engine 610 can be used to reduce the corpus of documents to a subset; the attitudes of this subset can then be searched using attitude search engine 605 to identify documents that have a similar attitude to a given signature. Alternatively, attitude search engine 605 can be used to identify documents in the corpus that have a similar attitude to a given signature, after which those documents can be searched using document search engine 610.

A person of ordinary skill in the art will recognize that a "document" can be anything that includes a set of words. For example, "documents" can include objects created by word processing programs, or a website on the Internet. But "documents" can also include objects that might not otherwise be considered documents: for example an image file that includes text that can be scanned, or a file that includes text as hidden metadata. In short, a "document" can include anything that has text that can be used to generate a signature.

Figure 7A:
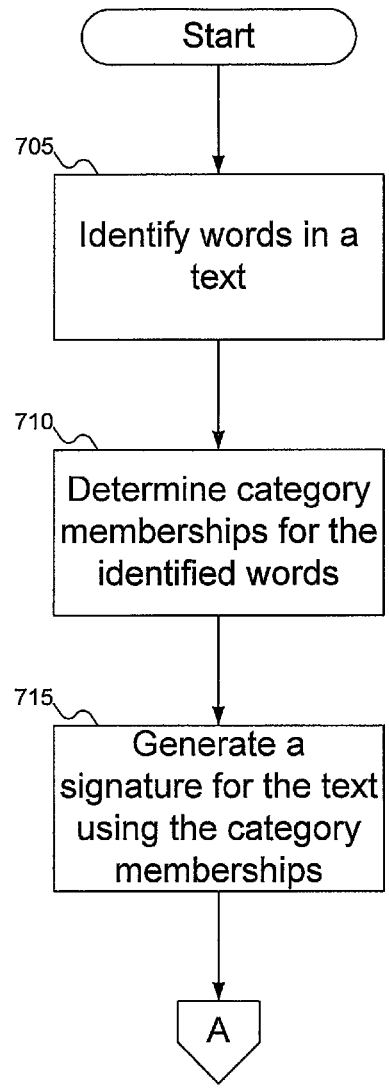
FIGS. 7A-7B show a flowchart of a procedure for using a signature to search a corpus of documents in the system of FIG. 1.
Figure 7B:
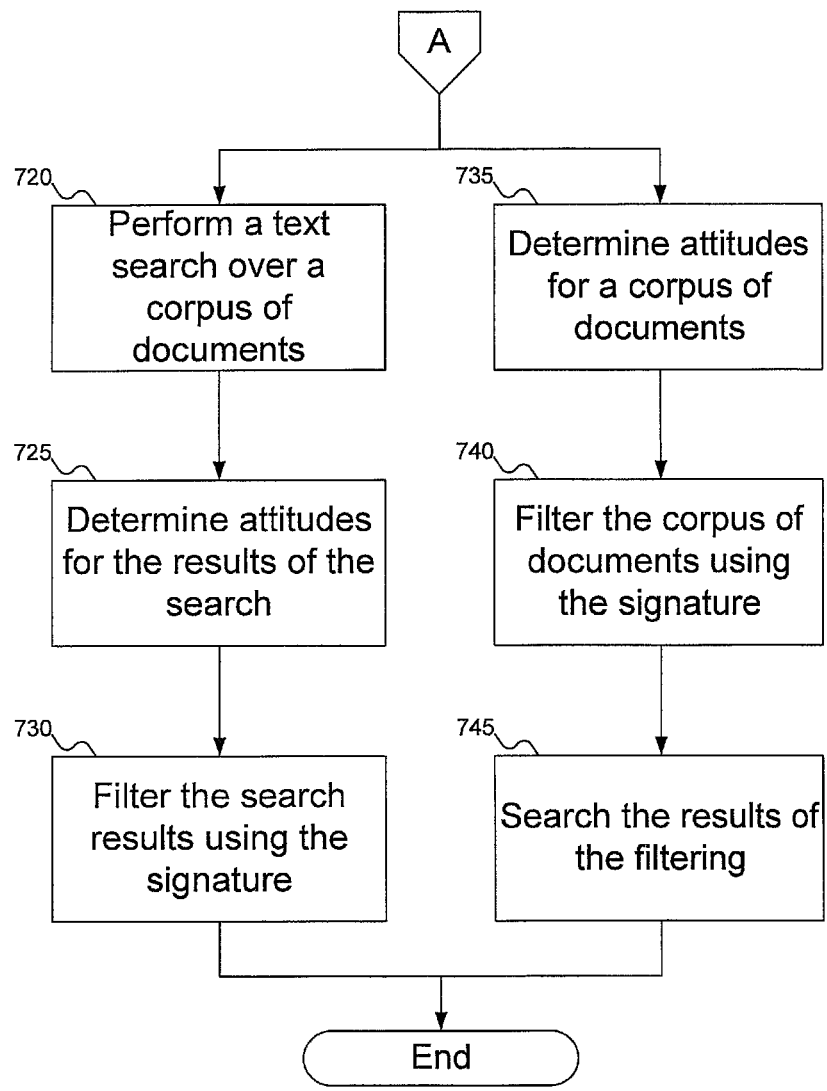

FIGS. 7A-7B show a flowchart of a procedure for using a signature to search a corpus of documents in the system of FIG. 1. In FIG. 7A, at block 705, words in a text are identified. At block 710, category memberships are determined for the identified words. As discussed above, the category memberships can be communication type memberships. At block 715, a signature for the text is generated, using the category memberships.

Once a signature has been generated, it can be used to search a corpus of documents. As shown in FIG. 7B, one possibility is to search the corpus of documents first using a text search, as shown in block 720. Then, at block 725, attitudes can be determined for the results of the search, and the results filtered using the signature, as shown in block 730.

Alternatively, attitudes can be determined for the documents in the corpus, as shown in block 735. The attitudes can be used to filter the documents in the corpus as shown in block 740, after which the results can be searched for text, as shown in block 745.

A person of ordinary skill in the art will recognize that the blocks shown in FIGS. 7A-7B can be performed in various different orders. Further, various blocks can be omitted. For example, blocks 705, 710, and 715 can be performed to generate a signature, without performing any search based on the signature. This could occur as part of determining an attitude for a document to support a search of the document against other signatures later.

The above discussion does not reflect what is considered to be "close" to a given signature. Any desired measure of "closeness" can be used. For example, relative to a given signature, any other signature that is no more distant than some pre-determined limit (either fixed or percentage) can be considered "close".

While the above discussion suggests that signatures are generated using a source text, a person of ordinary skill in the art will recognize that signatures can be generated in other manners. For example, a user can manually enter a signature to use. Even more generally, a user can input a range of signatures. For example, a user can enter several signatures that represent the corners of an m-dimensional polygon: any signature within that polygon is considered to be within the range of the signatures. Or a user can enter ranges for the individual combinations of communication types, with any signature that satisfies the various coordinate ranges considered to be within the range of the signatures. Other possible sources for signatures, and limits for ranges, can be used.

Figure 8:
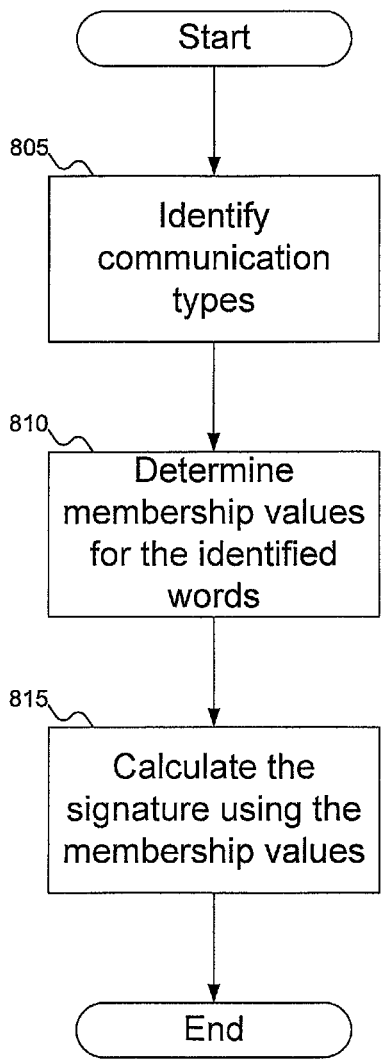
FIG. 8 show a flowchart of a procedure for generating a signature using the signature generator of FIG. 1.

FIG. 8 show a flowchart of a procedure for generating a signature using the signature generator of FIG. 1. In FIG. 8, at block 805 communication types are identified. At block 810, membership numerical values in the communication types for the identified words are determined. At block 815, a signature can be calculated using the membership numerical values.

The following discussion is intended to provide a brief, general description of a suitable machine in which certain aspects of the invention may be implemented. Typically, the machine includes a system bus to which is attached processors, memory, e.g., random access memory (RAM), read-only memory (ROM), or other state preserving medium, storage devices, a video interface, and input/output interface ports. The machine may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, or a system of communicatively coupled machines or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine may include embedded controllers, such as programmable or non-programmable logic devices or arrays, Application Specific Integrated Circuits, embedded computers, smart cards, and the like. The machine may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciated that network communication may utilize various wired and/or wireless short range or long range carriers and protocols, including radio frequency (RF), satellite, microwave, Institute of Electrical and Electronics Engineers (IEEE) 810.11, Bluetooth, optical, infrared, cable, laser, etc.

The invention may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Having described and illustrated the principles of the invention with reference to illustrated embodiments, it will be recognized that the illustrated embodiments may be modified in arrangement and detail without departing from such principles. And, though the foregoing discussion has focused on particular embodiments, other configurations are contemplated. In particular, even though expressions such as "in one embodiment" or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

The invention claimed is:

1. A system, comprising:
   a computer;
   a first set of categories;
   a second set of words, where each word in the second set of words is a member of one or more of the first set of categories;
   a word identifier on the computer, the word identifier configured to identify words in a text; and
   a signature generator configured to generate a signature for said text using said words identified by the word identifier in said text and said category memberships for each word.

2. A system according to claim 1, wherein the first set of categories includes at least a content dimension and a quality dimension.

3. A system according to claim 2, wherein the first set of categories includes at least a form dimension.

4. A system according to claim 2, wherein:
   the system further comprises:
      a third set of communication types;
      for each word in the second set of words, a membership value in each communication type; and
   the signature generator is operative to calculate the signature as the sum of the membership numerical values for each of said words identified by the word identifier in said text in the communication types in the combination, divided by the number of non-zero membership numerical values for each of said words identified by the word identifier in said text in the communication types in the combination.

5. A system according to claim 1, further comprising an attitude search engine to search for documents that are similar to a given signature.

6. A system according to claim 5, further comprising a document search engine, where the attitude search engine is applied before the document search engine.

7. A system according to claim 5, further comprising a document search engine, where the attitude search engine is applied after the document search engine.

8. A system according to claim 1, further comprising a word adder configured to add a new word to the second set of words.

9. A system according to claim 8, wherein the word adder includes a membership assigner configured to assign memberships in said first set of categories for said new word.

10. A method for using attitude about text, comprising:
    identifying at least two words in the text using a computer;
    determining category memberships for the at least two words; and
    using the category memberships for the at least two words to establish a signature for the at least two words, the signature for the at least two words representing the attitude about the text.

11. A method according to claim 10, wherein determining category memberships for the at least two words includes determining category memberships for the at least two words along at least a content dimension and a quality dimension.

12. A method according to claim 11, wherein determining category memberships for the at least two words further includes determining category memberships for the at least two words along a form dimension.

13. A method according to claim 11, wherein using the category memberships for the at least two words to establish a signature for the at least two words includes:
    identifying communication types;
    determining a membership value in each communication type for each of the at least two words; and
    for each combination of communication types, calculating the sum of the membership numerical values for each of the at least two words in the communication types in the combination, divided by the number of non-zero membership numerical values for each of the at least two words in the communication types in the combination.

14. A method according to claim 10, further comprising combining the attitude about text with a text search of a corpus of documents.

15. A method according to claim 14, wherein combining the attitude about text with a text search includes:
- performing the text search over the corpus of documents to generate search results including at least one text; and
- determining an attitude for the at least one text in the search results.

16. A method according to claim 15, wherein combining the attitude about text with a text search further includes using the attitude about text to filter the at least one text in the search results.

17. A method according to claim 14, wherein combining the attitude about text with a text search includes:
- determining an attitude for each document in the corpus of documents;
- using the attitude about text to identify a subset of documents in the corpus of documents; and
- performing the text search on the subset of documents.

18. A method according to claim 14, further comprising adding a new category membership for a new word.

19. An article, comprising a tangible non-transitory storage medium, said non-transitory storage medium having stored thereon instructions that, when executed by a machine, result in:
- identifying at least two words in the text;
- determining category memberships for the at least two words; and
- using the category memberships for the at least two words to establish a signature for the at least two words, the signature for the at least two words representing the attitude about the text.

20. An article according to claim 19, wherein determining category memberships for the at least two words includes determining category memberships for the at least two words along at least a content dimension and a quality dimension.

21. An article according to claim 20, wherein determining category memberships for the at least two words further includes determining category memberships for the at least two words along a form dimension.

22. An article according to claim 20, wherein using the category memberships for the at least two words to establish a signature for the at least two words includes:
- identifying communication types;
- determining a membership value in each communication type for each of the at least two words; and
- for each combination of communication types, calculating the sum of the membership numerical values for each of the at least two words in the communication types in the combination, divided by the number of non-zero membership numerical values for each of the at least two words in the communication types in the combination.

23. An article according to claim 19, said non-transitory storage medium having stored thereon further instructions that, when executed by a machine, result in combining the attitude about text with a text search of a corpus of documents.

24. An article according to claim 23, wherein combining the attitude about text with a text search includes:
- performing the text search over the corpus of documents to generate search results including at least one text; and
- determining an attitude for the at least one text in the search results.

25. An article according to claim 24, wherein combining the attitude about text with a text search further includes using the attitude about text to filter the at least one text in the search results.

26. An article according to claim 23, wherein combining the attitude about text with a text search includes:
- determining an attitude for each document in the corpus of documents;
- using the attitude about text to identify a subset of documents in the corpus of documents; and
- performing the text search on the subset of documents.

27. An article according to claim 23, said non-transitory storage medium having stored thereon further instructions that, when executed by a machine, result in adding a new category membership for a new word.

* * * * *

UNITED STATES PATENT AND TRADEMARK OFFICE
CERTIFICATE OF CORRECTION

PATENT NO. : 8,996,359 B2
APPLICATION NO. : 13/462488
DATED : March 31, 2015
INVENTOR(S) : Warren L. Wolf and Manu Rehani It is certified that error appears in the above-identified patent and that said Letters Patent is hereby corrected as shown below:

In the Claims

Col. 9, line 23, Claim 9, the word "tangible" should be deleted.

Signed and Sealed this
Fourteenth Day of July, 2015

Michelle K. Lee
*Director of the United States Patent and Trademark Office*